(12) United States Patent
Searles

(10) Patent No.: US 8,532,300 B1
(45) Date of Patent: Sep. 10, 2013

(54) SYMMETRIC IS ENCRYPTION KEY MANAGEMENT

(75) Inventor: Justin Searles, Tyngsboro, MA (US)

(73) Assignee: EMC Corporation, Hopkinton, MA (US)

(*) Notice: Subject to any disclaimer, the term of this patent is extended or adjusted under 35 U.S.C. 154(b) by 1200 days.

(21) Appl. No.: 11/706,172

(22) Filed: Feb. 13, 2007

(51) Int. Cl.
*H04L 9/08* (2006.01)

(52) U.S. Cl.
USPC .......................... 380/278; 380/277; 713/171

(58) Field of Classification Search
USPC .......................................... 380/278; 713/171
See application file for complete search history.

(56) References Cited

U.S. PATENT DOCUMENTS

| | | | | |
|---|---|---|---|---|
| 6,009,174 A * | 12/1999 | Tatebayashi et al. | ......... | 380/277 |
| 6,898,288 B2 * | 5/2005 | Chui | ............................. | 380/278 |
| 7,401,232 B2 * | 7/2008 | Ono et al. | ..................... | 713/193 |
| 7,506,161 B2 * | 3/2009 | Mizrah | ......................... | 713/168 |
| 7,506,367 B1 * | 3/2009 | Ishibashi | ......................... | 726/10 |
| 7,734,051 B2 * | 6/2010 | Carter et al. | ................... | 380/273 |
| 7,765,582 B2 * | 7/2010 | Spies et al. | ....................... | 726/3 |
| 7,840,489 B2 * | 11/2010 | Candelore | ....................... | 705/59 |
| 8,098,828 B2 * | 1/2012 | Carter et al. | ................. | 380/278 |
| 2002/0097878 A1 * | 7/2002 | Ito et al. | .......................... | 380/277 |
| 2002/0114461 A1 * | 8/2002 | Shimada et al. | ............ | 380/201 |
| 2002/0184513 A1 * | 12/2002 | Hori et al. | ..................... | 713/193 |
| 2003/0026433 A1 * | 2/2003 | Matt | .............................. | 380/278 |
| 2004/0039911 A1 * | 2/2004 | Oka et al. | ...................... | 713/175 |
| 2004/0052377 A1 * | 3/2004 | Mattox et al. | ................ | 380/277 |
| 2004/0186997 A1 * | 9/2004 | Todaka | .......................... | 713/168 |
| 2005/0071279 A1 * | 3/2005 | Asano | .............................. | 705/57 |
| 2005/0125683 A1 * | 6/2005 | Matsuyama et al. | .......... | 713/189 |
| 2005/0177740 A1 * | 8/2005 | Athaide et al. | ................ | 713/189 |
| 2006/0149683 A1 * | 7/2006 | Shimojima et al. | ............. | 705/59 |
| 2006/0222177 A1 * | 10/2006 | Iwamoto et al. | .............. | 380/200 |
| 2007/0055878 A1 * | 3/2007 | Sandhu et al. | ................ | 713/171 |
| 2007/0160209 A1 * | 7/2007 | Kasahara et al. | ............. | 380/217 |
| 2007/0165844 A1 * | 7/2007 | Little | .............................. | 380/30 |
| 2007/0198859 A1 * | 8/2007 | Harada et al. | ................ | 713/193 |
| 2007/0294528 A1 * | 12/2007 | Shoji et al. | .................... | 713/159 |

FOREIGN PATENT DOCUMENTS

| JP | 2005020154 | * | 1/2006 |
|---|---|---|---|
| WO | WO 2006/003778 | * | 1/2006 |
| WO | WO 2006003778 A1 | * | 1/2006 |

OTHER PUBLICATIONS

English Translation of the Japanes Application Publication No. JP 2006-020154 A.*
Nishi et al., "Group Key Distribution Scheme for Reducing Required Rekey Message Size," 2005, IEEE, pp. 1-5.*
Wacker et al., "A Key-Distribution Scheme for Wireless Home Automation Networks," 2004, IEEE, pp. 47-53.*
Sato et al., "A Push-Based Key Distribution and Rekeying Protocol for Secure Multicasting," 2001, IEEE, pp. 214-220.*
Moharrum et al., "Efficient Secure Multicast with Well-Populated Multicast Key Trees," 2004, IEEE, pp. 1-8.*

* cited by examiner

*Primary Examiner* — Luu Pham

(74) *Attorney, Agent, or Firm* — Dergosits & Noah LLP; Todd A. Noah

(57) ABSTRACT

Secure key management is provided for a symmetric encryption key. The symmetric encryption key is encrypted differently for two or more devices via which the symmetric encryption key is stored.

17 Claims, 4 Drawing Sheets

SYMMETRIC IS ENCRYPTION KEY MANAGEMENT

BACKGROUND

1. Technical Field

The techniques described herein relate to encryption, and in particular to managing a symmetric encryption key.

2. Discussion of Related Art

A symmetric key algorithm is a cryptographic algorithm in which the same key is used for both encryption and decryption. Symmetric key algorithms are advantageous because they can be faster and easier to implement than asymmetric key algorithms. However, maintaining the security of a symmetric key encryption system, e.g., during key distribution and storage, is particularly important.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have developed techniques for managing distribution of a symmetric encryption key. In one embodiment, a symmetric key may be encrypted differently on two or more computers via which the symmetric key is stored. As a result, it can be more difficult for an attacker to determine the unencrypted version of the symmetric encryption key.

Another embodiment relates to distribution of a symmetric key to one or more computers via a server. A symmetric encryption key may be generated in any suitable manner and stored in a data location on the server. One or more computers may then read the symmetric encryption key from the server.

The techniques described herein for managing distribution and/or storage of a symmetric key can be used in computer systems of numerous types, with the symmetric key being used to encrypt/decrypt information of any suitable type, as the techniques described herein are not limited in this respect. In one example described below, a symmetric key is used to encrypt/decrypt authentication information (e.g., a username and/or password) providing access to a computer system resource (e.g., an application program), but this is merely one example, as other uses are possible. Using a symmetric encryption key and the distribution techniques described herein can provide a secure, simple and high-speed method for managing a symmetric encryption key.

Figure 1:
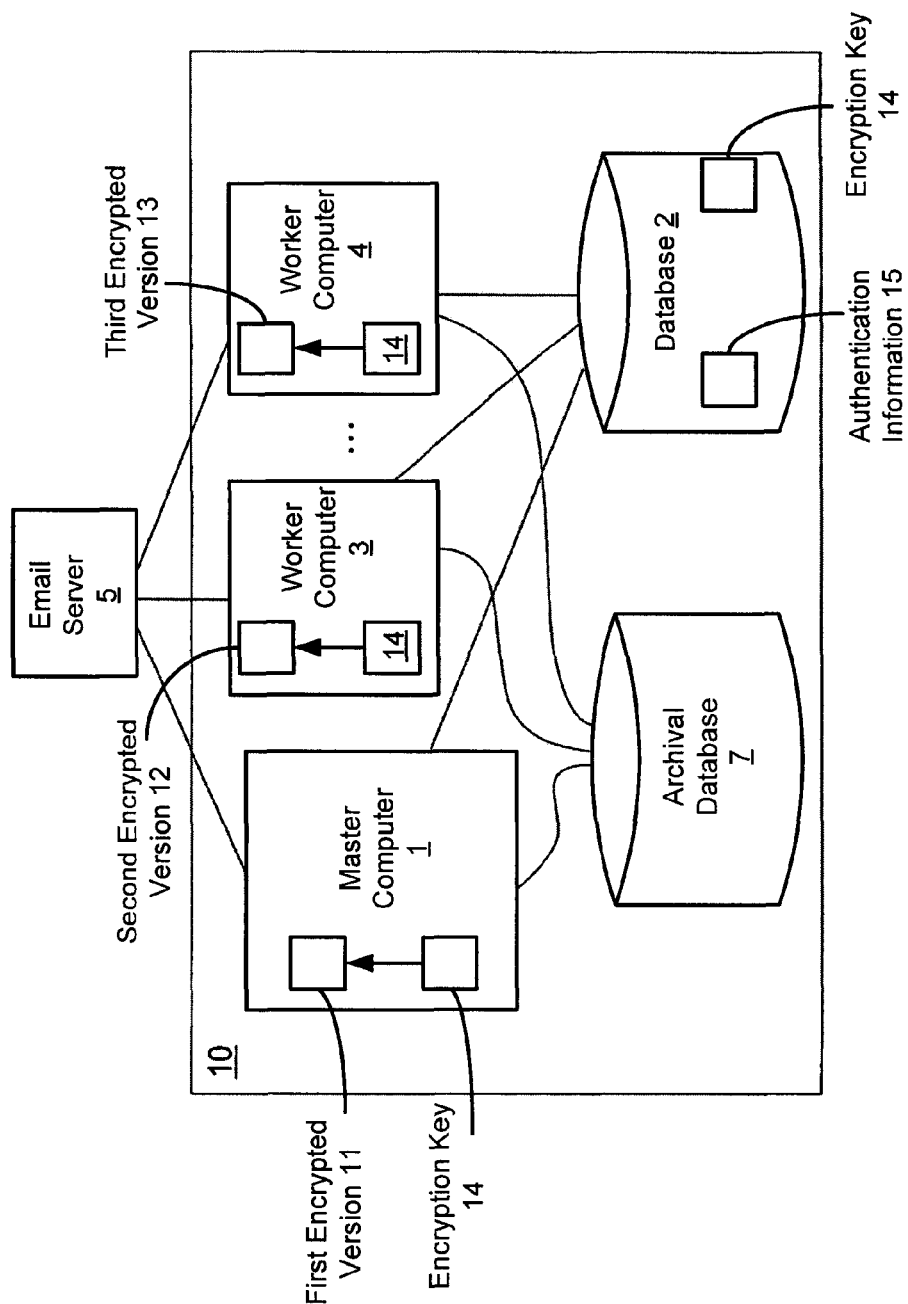
FIG. 1 is a diagram illustrating a computer system in which embodiments of the invention may be implemented.

One example of a system in which the techniques described herein can be used is in an email archiving and retrieval system for an organization. FIG. 1 is a diagram illustrating an example of such a computer system 10.

The computer system 10 communicates with an organization's email servers(s) 5 so that incoming and outgoing emails can be archived in an archival database 7, based upon an archival policy enforced by computer system 10. Any suitable database may be used as archival database 7, examples of which include products from the DOCUMENTUM® family of products provided by EMC Corporation of Hopkinton, Mass.

In the illustrative implementation of FIG. 1, computer system 10 includes a master computer 1 and a plurality of worker computers 3 and 4 that perform tasks of archiving to and retrieving emails from archival database 7, and a database 2 that facilitates communication among the computers. Master computer 1 may direct the operation of worker computers 3 and 4 for the purpose of email archival and retrieval, as discussed further below. The archiving and retrieval system may alternatively include only a single computer. However, using a plurality of computers may increase system throughput. If a master/worker architecture is used, the master computer may create archiving and retrieval tasks that the master computer sends to the worker computers to perform. It should be appreciated that the techniques disclosed herein are not limited to use in an email archiving and retrieval system that uses a master/worker architecture, as any suitable architecture may be used. Furthermore, techniques disclosed herein are not limited to use in email archiving and retrieval systems, and may be used in any type of computer systems in which a symmetric encryption key is distributed to, or stored on, two or more computers.

Computer system 10 may archive and retrieve emails in ways that facilitate legal discovery on email chains, or in any other way. To do so, computers 1, 3 and/or 4 may communicate with email server(s) 5 and archival database 7. The email server(s) 5 and archival database 7 each may have its own separate (and perhaps proprietary) authentication system, most typically using a user name and password. Thus, to access email server(s) 5 and/or archival database 7, the email archive system 10 may need to store authentication information (e.g., a username and/or password). The email archival system illustrated in FIG. 1 is a distributed system wherein multiple computers (e.g., computers 1, 3 and 4, although configurations with greater numbers of computers are possible) may access email server(s) 5 and archival database 7. Thus, multiple computers each may need to store authentication information for one or more of these systems. To protect the security of the emails, which may contain confidential, proprietary and/or otherwise sensitive information, it may be desirable to ensure that the authentication information (e.g., usernames and/or passwords) is stored securely, so that it cannot be obtained by an unauthorized user who could use the authentication information to gain unauthorized access to the email server(s) 5 and/or archival database 7 in which the emails are stored.

To protect the authentication information, it may be stored in database 2, which may be a secure database that provides secure data storage by providing one or more safeguards to prevent unauthorized access to the data stored therein, as will be discussed in further detail below. The authentication information may be encrypted using the symmetric encryption key, and stored in encrypted form. When one or more of the computers in the system (e.g., computers 1, 3 and/or 4) wish to use the authentication information, they may obtain the encrypted authentication information from database 2 and decrypt the authentication information using the symmetric encryption key.

The techniques described herein may be used to enable the symmetric key to be distributed among each of the computers (e.g., 1, 3 and 4) of the system 10 that may employ the symmetric encryption key, so that each may use the symmetric encryption key to decrypt the encrypted authentication information (e.g., usernames and/or passwords) obtained from database 2. Distributing and maintaining a symmetric encryption key on multiple computers (e.g., computers 1, 3 and 4) presents a security risk because the symmetric encryption key is exchanged and stored on different devices.

In one embodiment, the symmetric key is stored in an encrypted form on multiple computers (e.g., computers 1, 3 and 4), and encrypted using a different encryption technique for two or more of the devices via which it is stored. As mentioned above, the embodiment that relates to encrypting the symmetric key differently on different computers is not limited to use on an email archival/retrieval system such as that shown in FIG. 1, and can be used in any computer system wherein a symmetric key is stored via two or more computers.

Figure 2:
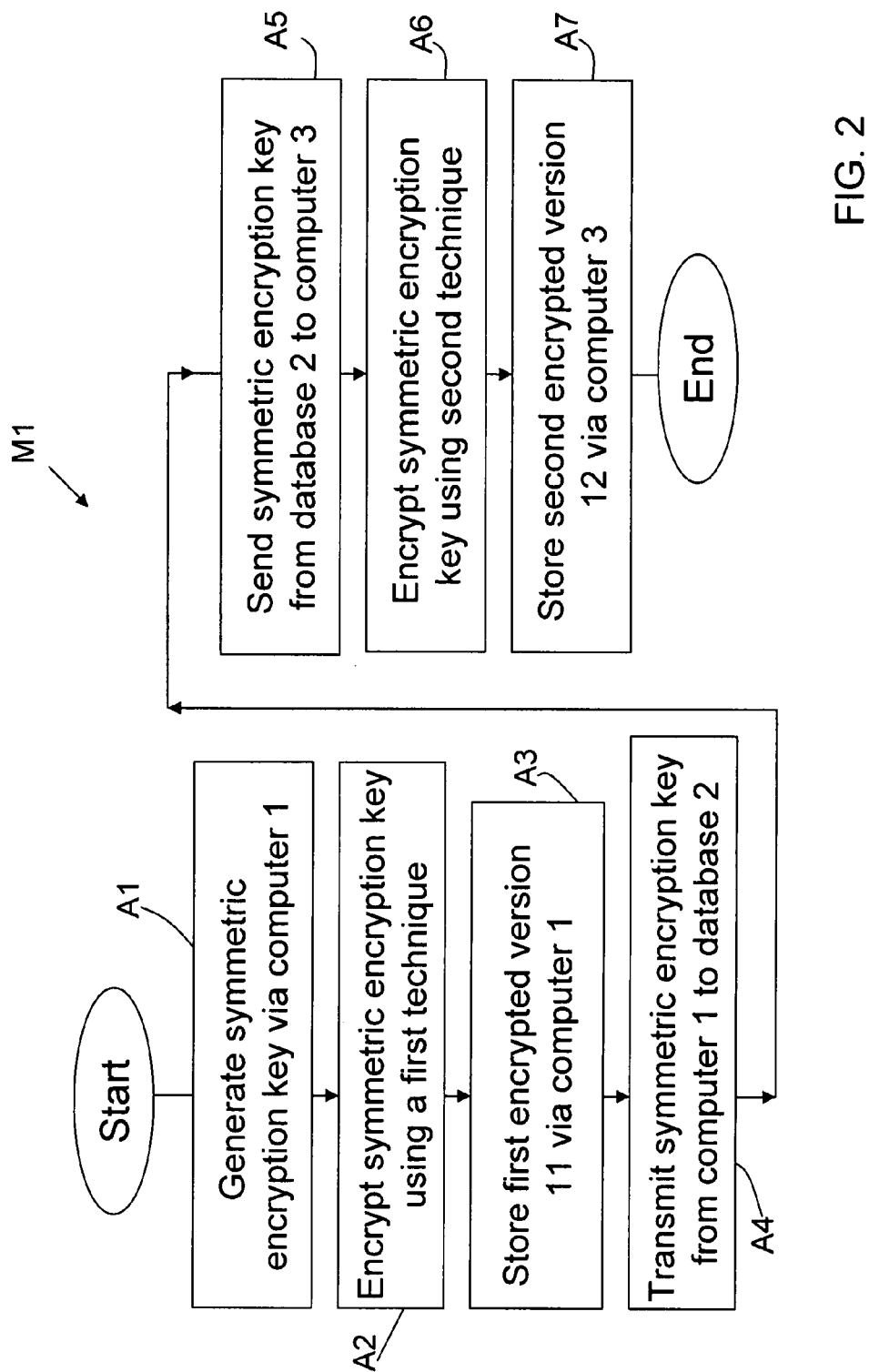
FIG. 2 is a flowchart of a method of distributing a symmetric key via a database, according to one embodiment.

FIG. 2 is a flowchart illustrating a method M1, according to one embodiment. In this embodiment, techniques are employed to ensure that the symmetric encryption key is maintained in a secure fashion while being stored at multiple computers (e.g., computers 1, 3 and 4 of the email archival and retrieval system of FIG. 1).

In act A1, a symmetric encryption key 14 is generated. The symmetric encryption key 14 may be generated in any suitable way, such as by using the Advanced Encryption Standard (AES) or any other suitable technique, as the techniques described herein are not limited to distributing keys of any particular type or generating keys in any particular way. As one example, symmetric key 14 may be a 128 bit key generated using AES. However, it should be appreciated that symmetric encryption key 14 may be of any suitable length. In one embodiment for use on the system of FIG. 1, master computer 1 generates the key. However, the techniques described herein are not limited in this respect, as the symmetric encryption key 14 could alternatively be generated using a device coupled to master computer 1, by any of worker computers 3 and 4 or a device coupled thereto, or any other suitable device.

In act A2, the symmetric encryption key 14 is encrypted for storage by master computer 1 using a first encryption technique. Any suitable encryption technique may be used to encrypt the symmetric encryption key. For example, the symmetric encryption key 14 may be encrypted using an application program interface (API) made available by the computer on which the symmetric key is to be stored in encrypted form (e.g., master computer 1). One example of a suitable API is the MICROSOFT DATA PROTECTION™ API, provided by Microsoft Corporation of Redmond, Wash. However, it should be appreciated that any suitable API or other encryption technique may be used to encrypt the symmetric encryption key.

In one embodiment, the first encryption technique may employ a "core" encryption technique that is customizable via information that can be input to the encryption technique. One example of a core encryption technique is the above-discussed API made available by master computer 1. If a core encryption technique is used, the way in which the core encryption technique performs the encryption may be customized by providing the core encryption technique with an initialization vector. An initialization vector may include information (e.g., a set of one or more numbers) chosen to customize the way in which the core encryption technique encrypts the symmetric encryption key. The initialization vector may be kept secret to prevent unauthorized individuals from attempting to exploit knowledge of the initialization vector to compromise the security of the system. In one embodiment, the initialization vector may include one or more randomly generated numbers. Using one or more randomly generated numbers in the initialization vector may prevent a computer from repeatedly performing the same encryption technique. Thus, if an attacker gains access to a computer that runs the core encryption technique, randomly generated initialization vectors may frustrate the attacker's attempts to gain information about the encryption. However, it should be appreciated that the embodiment directed to using different encryption techniques on different machines is not limited to using a core encryption technique with an initialization vector, as any suitable encryption techniques may be used.

In one embodiment, one or more aspects of an encryption technique, such as the core encryption technique, may be provided in a library of one or more software components. The software component(s) may include functions for generating the symmetric encryption key, encrypting and decrypting the symmetric encryption key and/or any other suitable functions. The functions may be passed an initialization vector for customization, as discussed above. Each of computers 1, 3 and 4 may have a copy of the library. The library code may be concealed and/or obfuscated in any suitable way to make it more difficult for an attacker to gain information about the employed encryption technique.

In act A3, the first encrypted version 11 of the symmetric key may be stored via master computer 1 for later use in encrypting and/or decrypting authentication information. The symmetric key may be stored on master computer 1 itself or on a device coupled to master computer 1. If the symmetric key is stored on master computer 1, the symmetric key may be stored in the registry (e.g., in the HKey Local Machine Hive). A registry is a database that is used to store important information (e.g., settings) for a computer operating system and/or one or more applications. The symmetric key may be stored in a secure portion of the registry that is only accessible to a system administrator. However, it should be appreciated that the symmetric key may be stored in any other suitable storage location.

After the symmetric encryption key 14 is generated, it may be distributed to other devices at any suitable time, including before, after, or in parallel with the key being encrypted for storage on the first computer and being stored thereon during act A2-A3. In the example of FIG. 2, key distribution begins in act A4, wherein the symmetric encryption key 14 may be transmitted from master computer 1 to database 2. In one embodiment, the symmetric encryption key 14 is sent over a secure channel, using any suitable protocol (e.g., IPSec), to safeguard its transmission. After receiving the symmetric encryption key, the database 2 may store the symmetric encryption key 14 in unencrypted format (e.g., in the SystemConfig Table of database 2 and/or in any other suitable location). The symmetric encryption key 14 may be stored in unencrypted format in database 2 because worker computers 3 and 4 may need to retrieve the key from database 2 as discussed below, and distributing the key to worker computers 3 and 4 in this manner is facilitated if the key is stored in unencrypted form.

Database 2 may be a secure database, secured via any suitable safeguard(s), such as physical, hardware and/or software security mechanism(s). As one example of a security mechanism, secure database 2 may be located in a room that is locked, and is only physically accessible to a select group of authorized individuals (e.g., system administrators). Access to the data stored in secure database 2 may be protected using a software and/or hardware authentication system that verifies the identity of a user and/or device attempting to write to or read from the secure database. Any suitable authentication techniques may be employed, such as techniques that check credentials such as a user password, a smart card, device information, biometric information and/or any other suitable credentials. It should be appreciated that the security techniques described above are merely illustrative, as the techniques described herein are not limited to distributing a symmetric key via a database, secured using any particular type of security technique. Database 2 may be associated with a computer, e.g., a database server, that responds to database queries from various computers (e.g., computers 1, 3 and 4), and which may control the storage and/or retrieval of information from database 2. If such a computer is used to control access to database 2, any suitable type of computer may be used. In some embodiments, no computer is used to control access to database 2, as access to database 2 may be provided in any other suitable way, and is not limited in this respect.

In act A5, the symmetric encryption key 14 is transmitted from the database 2 to computer 3. The symmetric encryption key may be sent in encrypted form over a secure channel, using any suitable protocol (e.g., IPSec). The transmission of the symmetric encryption key 14 from database 2 to computer 3 can be controlled in any manner, as the techniques described herein are not limited in this respect. In one embodiment, after the first computer 1 has stored the symmetric key in the database 2, the first computer can inform other computers to which the key is to be distributed (e.g., computers 3 and 4 in FIG. 1) that the symmetric encryption key 14 is available to be retrieved from the database 2 and provide identifying information that enables the key to be retrieved from the database 2. Thereafter, other computers to which the key is to be distributed can initiate communication with the database 2 and retrieve the key 14. However, the techniques described herein are not limited to this distribution technique, as other ways of effecting the transmittal of the key 14 from database 2 to other computers in the system are possible. FIG. 2 illustrates transferring the symmetric key to only computer 3. However, it should be appreciated that similar techniques can be used to transfer the key to computer 4. In systems with a larger number of computers to which the symmetric key is to be distributed, the symmetric key can be distributed to any number of computers.

After computer 3 receives the symmetric encryption key 14, computer 3 may encrypt the key in act A6 using a second encryption technique that is different from the first encryption technique used by computer 1, and which results in a second encrypted version 12 of the symmetric encryption key.

As mentioned above, encrypting the key on different computers using different techniques can be advantageous from a security perspective. However, not all embodiments are limited in this respect, and in some embodiments the symmetric encryption key can be encrypted on two or more computers using a same encryption technique. When a different technique is to be employed, it can be accomplished in any way. For example, the same core encryption technique may receive different initialization vectors on different computers. The core encryption technique may use a device identifier (e.g., a device's IEEE Standard 802 MAC address) that will be different on the different devices, thus resulting in different encrypted versions of the symmetric encryption key. When used in a system with three or more computers, the use of a same core encryption technique with a device identifier as at least a portion of an initialization vector (or other input) can result in a unique encryption technique on each computer.

As another example, the core encryption technique may use a "timestamp" (e.g., information relating to the time at which the technique is employed) as at least a portion of an initialization vector (or other input). The timestamp may be different on different devices because their system clocks may not be synchronized, and/or because the encryption technique may not be performed at the same time.

As a further example, the different computers may employ different core encryption techniques. Thus, there are a variety of ways in which the two or more different encryption techniques may be implemented, resulting in different encrypted versions of the symmetric encryption key, and the techniques described herein are not limited to any particular implementation technique.

In act A7, the second encrypted version 12 of the symmetric key may be stored via worker computer 3 for later use (e.g., in encrypting and/or decrypting authentication information). The symmetric key may be stored on worker computer 3 itself or on a device coupled to worker computer 3. If the symmetric key is stored on worker computer 3, the symmetric key may be stored in the registry (e.g., in the HKey Local Machine Hive). However, it should be appreciated that the symmetric key may be stored in any other suitable storage location.

After the performance of method M1, computers 1 and 3 have stored different encrypted versions (11 and 12, respectively) of the same symmetric encryption key 14. It should be appreciated that when used in systems with three or more computers, each may perform a different encryption technique and store a different version of the symmetric encryption key, or alternatively two or more computers may employ the same technique. As discussed above, in one embodiment, the same core encryption technique may be used on multiple computers with an input that uses information specific to each computer, so each encrypted version is different. For example, worker computer 4 may receive the symmetric encryption key 14, and may perform the same core encryption technique as computer 3 but with a different input, based at least partially on information specific to computer 4. This may result in a different encrypted version 13 of the symmetric encryption key which may be stored via computer 4 in any suitable way. It should be appreciated that the techniques described herein may be used in a system with more than three computers, at least two of which store different encrypted versions of the symmetric encryption key 14. In one embodiment, each of the computers stores a different encrypted version of the symmetric encryption key 14.

When the techniques described herein are used in an email archive system such as that shown in FIG. 1, a system administrator may provide the appropriate authentication information for each email server 5 and for archival database 7. The authentication information can be provided in any suitable way (e.g., via a user interface provided by the master computer 1). Once master computer 1 (or any computer in the system) receives the authentication information 15, it can be distributed using any suitable technique. In one embodiment, the authentication information 15 (or a portion thereof, e.g., a password) may be encrypted with the symmetric encryption key and stored in database 2. Storing sensitive information, such as authentication information 15, in encrypted form in a secure database 2 can provide a higher level of security for the authentication information than storing the authentication information on the respective computers (e.g., computers 1, 3 and 4). In one embodiment, the authentication information is not stored permanently on computers 1, 3 or 4 to avoid the risk associated with storing additional stored copies of this information. Rather, the authentication information may be obtained from database 2 as needed by computers 1, 3 and/or 4, and decrypted using the symmetric encryption key. In this respect, workers computers (e.g., computers 3 and 4) may perform the tasks of e-mail archiving and retrieval, and may access email servers(s) 5 and archival database 7 accordingly. The authentication information can be distributed, decrypted and presented to those resources to gain access to them by computers 1, 3 and/or 4. When the authentication information is stored via computers 1, 3 and/or 4, the authentication information may be stored in the registry of the computers, or in any other suitable location.

Figure 3:
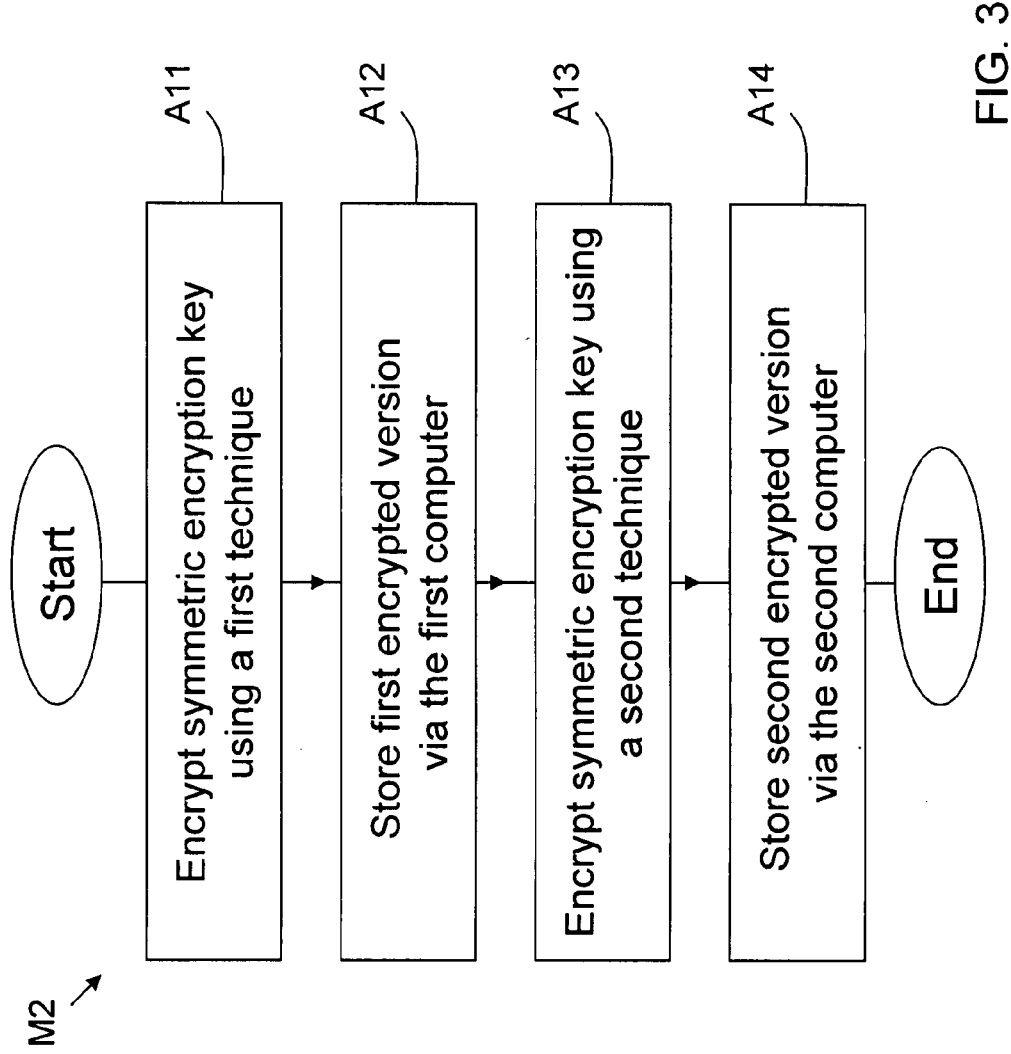
FIG. 3 is a flowchart of a method of storing differently encrypted versions of a symmetric key on different computers, according to another embodiment.

As discussed above, in one embodiment a technique for managing distribution of a symmetric encryption key is employed wherein the key is stored on two or more computers (e.g., 1, 3 and 4) and encrypted using different encryption techniques. An illustrative method M2 used for implementing this technique is illustrated in FIG. 3.

The symmetric key may be obtained by a first computer (e.g., computer 1 in FIG. 1) in any suitable way, such as using any of the techniques described above for generating or otherwise obtaining a symmetric encryption key, or any other suitable techniques.

In act A11, the symmetric encryption key is encrypted using a first encryption technique, which may include any of the techniques described above and/or any other suitable technique. The symmetric encryption key may be encrypted by a first computer (e.g., computer 1 in FIG. 1) for storage via the first computer.

In act A12, the first encrypted version 11 of the symmetric encryption key may be stored via the first computer (e.g., computer 1 in FIG. 1), in the registry of the first computer or in any other suitable location, as discussed above. As used herein, the phrase "stored via a computer" means that the data is stored on the computer or at the direction of the computer but on a device coupled to the computer. For example, the symmetric encryption key may be stored in any suitable data storage portion of the first computer and/or a storage device coupled to the first computer.

The symmetric key may be obtained by a second computer (e.g., computer 3) in any suitable way, e.g., using any of the distribution techniques described above or any other suitable technique. In act A13, the symmetric encryption key may be encrypted using a second encryption technique that is different from the first encryption technique used by the first computer.

After performing the second encryption technique, the second encrypted version 12 may be stored in act A14 via the second computer (e.g., computer 3). The second encrypted version of the symmetric encryption key may be stored in any suitable way, examples of which are discussed above. For example, the symmetric encryption key may be stored in any suitable data storage portion of the second computer (e.g., the registry) and/or a memory device coupled to the second computer.

Several embodiments have been described in the context of an archival and retrieval system for emails. However, it should be appreciated that the techniques described herein are not limited to methods of performing archival and retrieval of emails, as the techniques described herein may be applied to any system in which a symmetric encryption key is stored by more than one computer. Any suitable type and number of computers may be used, as the techniques described herein are not limited in these respects. The symmetric encryption key may be used to encrypt authentication information and/or any other suitable type of information, as the techniques described herein are not limited in this respect.

It should be appreciated that the various devices described herein may communicate with one another in any suitable way, e.g., using a wired and/or wireless connection, as the techniques described herein are not limited to use in a system that uses any particular communication technique. Although the devices shown in FIG. 1 are illustrated as communicating directly with one another, they could communicate with each other via one or more networks.

The symmetric key management techniques described herein have been described as including multiple acts. It should be appreciated that the acts do not need to be performed in the order described herein, as at least some acts may be performed in a different order, and at least some acts may be performed simultaneously. For example, the symmetric encryption key can be encrypted by at least two devices in any suitable order, and need not be encrypted first by any particular device. One of ordinary skill in the art will readily appreciate that a variety of such modifications are possible.

Figure 4:
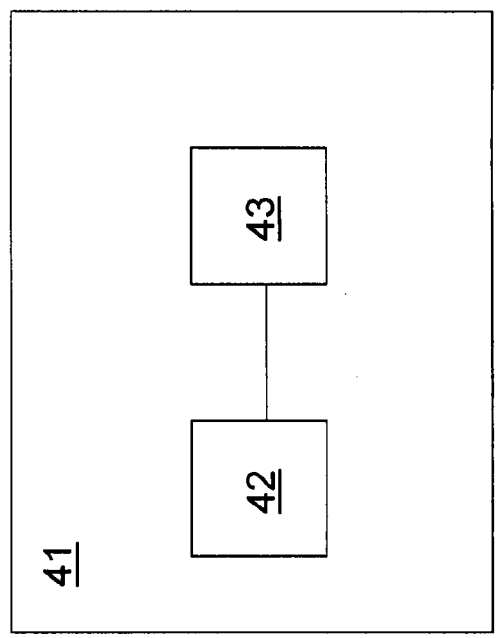
FIG. 4 is a diagram illustrating a computer in which embodiments of the invention may be implemented.

FIG. 4 is a diagram illustrating a computer 41 in which embodiments of the invention may be implemented. Computer 41 may be suitable to function as one or more of computers 1, 3 and/or 4, discussed above. It should be appreciated that the above-described embodiments can be implemented in any of numerous ways. The embodiments may be implemented using hardware, software or a combination thereof. When implemented in software, the software code can be executed on any suitable processor 42 or collection of processors, whether provided in a single computer 41 or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present techniques described herein comprises at least one computer-readable medium 43 (e.g., a computer memory, a floppy disk, a compact disk, a tape, etc.) encoded with a computer program (i.e., a plurality of instructions), which, when executed on a processor (e.g., processor 42), performs the above-discussed functions of the embodiments of the present invention. The computer-readable medium 43 can be transportable such that the program stored thereon can be loaded onto any computer environment resource to implement one or more embodiment(s). In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments wherein processes are implemented in a computer readable medium 43, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments in detail, various modifications and improvements will readily occur to those skilled in the art. Such modifications and improvements are intended to be within the spirit and scope of the invention. Accordingly, the foregoing description is by way of example only, and is not intended as limiting. The techniques described herein are limited only as defined by the following claims and the equivalents thereto.

What is claimed is:

1. A method of managing distribution of a symmetric encryption key in a computer system having a plurality of computers including at least a first computer, a second computer and a third computer, the method comprising:
    generating and storing a symmetric encryption key in unencrypted format;
    distributing the unencrypted symmetric encryption key in parallel to the plurality of computers;
    encrypting the unencrypted symmetric encryption key with the first computer using a first encryption technique based on an identification of the first computer to obtain a first encrypted version of the symmetric encryption key based on an identification of the first computer;
    storing the first encrypted version of the symmetric encryption key by the first computer;
    encrypting the unencrypted symmetric encryption key with the second computer using a second encryption technique based on an identification of the second computer to obtain a second encrypted version of the symmetric encryption key based on an identification of the first computer, the second encryption technique being different from the first encryption technique so that the second encrypted version is different from the first encrypted version;
    storing the second encrypted version of the symmetric encryption key by the second computer;
    encrypting the unencrypted symmetric encryption key with the third computer using a third encryption technique based on an identification of the third computer to obtain a third encrypted version of the symmetric encryption key based on an identification of the third computer, the third encrypted version and the first and second encrypted versions collectively forming a plurality of encrypted versions wherein no two of the plurality of encrypted versions are identical;
    storing a unique one of the third encrypted version of the symmetric encryption key by the third computer; and
    using the first encrypted version of the symmetric encryption key at the first computer, the second encrypted version of the symmetric encryption key at the second computer and the third encrypted version of the symmetric encryption key at the third computer to encrypt or decrypt data.

2. The method of claim 1, wherein storing the first encrypted version of the symmetric encryption key comprises storing the first encrypted version of the symmetric encryption key on the first computer.

3. The method of claim 1, wherein storing the first encrypted version of the symmetric encryption key comprises storing the first encrypted version of the symmetric encryption key on a storage device coupled to the first computer.

4. The method of claim 1, wherein encrypting the symmetric encryption key using the first encryption technique comprises encrypting the symmetric encryption key on the first computer using the first encryption technique to obtain the first encrypted version of the symmetric encryption key; and
    wherein encrypting the symmetric encryption key using the second encryption technique comprises encrypting the symmetric encryption key on the second computer using the second encryption technique to obtain the second encrypted version of the symmetric encryption key.

5. The method of claim 4, wherein the first encryption technique and the second encryption technique comprise a same core encryption technique.

6. The method of claim 5, wherein the first encryption technique and the second encryption technique employ at least one different input.

7. The method of claim 1, further comprising:
    prior to encrypting the symmetric encryption key using the first encryption technique, generating the symmetric encryption key by the first computer;
    prior to encrypting the symmetric encryption key using the second encryption technique, transmitting the symmetric encryption key from the first computer to a secure database;
    storing the symmetric encryption key in the secure database; and
    transmitting the symmetric encryption key from the secure database to the second computer.

8. A computer program product, comprising a non-transitory computer usable medium having a computer readable program code embodied thereon, the computer readable program code adapted to be executed to implement a method of managing distribution of a symmetric encryption key in a computer system, the computer system having a plurality of computers including at least a first, a second computer and a third computer, the method comprising:
    generating and storing a symmetric encryption key in unencrypted format;
    distributing the unencrypted symmetric encryption key in parallel to the plurality of computers;
    encrypting the unencrypted symmetric encryption key with the first computer using a first encryption technique based on an identification of the first computer to obtain a first encrypted version of the symmetric encryption key;
    storing the first encrypted version of the symmetric encryption key by the first computer;
    encrypting the unencrypted symmetric encryption key with the second computer using a second encryption technique based on an identification of the second computer to obtain a second encrypted version of the symmetric encryption key, the second encryption technique being different from the first encryption technique so that the second encrypted version is different from the first encrypted version;
    storing the second encrypted version of the symmetric encryption key by the second computer;
    encrypting the unencrypted symmetric encryption key with the third computer using a third encryption technique based on an identification of the third computer to obtain a third encrypted version of the symmetric encryption key based on an identification of the third computer, the third encrypted version and the first and second encrypted versions collectively forming a plurality of encrypted versions wherein no two of the plurality of encrypted versions are identical;
    storing a unique one of the third encrypted version of the symmetric encryption key by the third computer; and
    using the first encrypted version of the symmetric encryption key at the first computer, the second encrypted version of the symmetric encryption key at the second computer and the third encrypted version of the symmetric encryption key at the third computer to encrypt or decrypt data.

9. The computer program product of claim 8, wherein storing the first encrypted version of the symmetric encryption key comprises storing the first encrypted version of the symmetric encryption key on the first computer.

10. The computer program product claim 8, wherein storing the first encrypted version of the symmetric encryption key comprises storing the first encrypted version of the symmetric encryption key on a storage device coupled to the first computer.

11. The computer program product of claim 8, wherein encrypting the symmetric encryption key using the first encryption technique comprises encrypting the symmetric encryption key on the first computer using the first encryption technique to obtain the first encrypted version of the symmetric encryption key; and wherein encrypting the symmetric encryption key using a second encryption technique comprises encrypting the symmetric encryption key on the second computer using the second encryption technique to obtain the second encrypted version of the symmetric encryption key.

12. The computer program product of claim 11, wherein the first encryption technique and the second encryption technique comprise a same core encryption technique.

13. The computer program product of claim 12, wherein the first encryption technique and the second encryption technique employ at least one different input.

14. A computer system comprising:

a plurality of computers including at least a first computer, a second computer and a third computer;

wherein the first computer is programmed to receive an unencrypted symmetric encryption key and to encrypt the unencrypted symmetric encryption key using a first encryption technique based on an identification of the first computer to obtain a first encrypted version of the symmetric encryption key and to store the first encrypted version of the symmetric encryption key by the first computer;

wherein the second computer is programmed to receive the unencrypted symmetric encryption key and to encrypt the unencrypted symmetric encryption key using a second encryption technique based on an identification of the second computer to obtain a second encrypted version of the symmetric encryption key and to store the second encrypted version of the symmetric encryption key by the second computer, the second encryption technique being different from the first encryption technique so that the second encrypted version is different from the first encrypted version;

wherein the third computer is programmed to receive the unencrypted symmetric encryption key and to encrypt the unencrypted symmetric encryption key using a third encryption technique based on an identification of the third computer to obtain a third encrypted version of the symmetric encryption key and to store the third encrypted version of the symmetric encryption key by the third computer, the third encrypted version and the first and second encrypted versions collectively forming a plurality of encrypted versions wherein no two of the plurality of encrypted versions are identical; and wherein the first encrypted version of the symmetric encryption key is used at the first computer, the second encrypted version of the symmetric encryption key is used at the second computer to encrypt or decrypt data, and the third encrypted version of the symmetric encryption key is used at the third computer to encrypt or decrypt data.

15. The computer system of claim 14, wherein the first encrypted version of the symmetric encryption key is stored on the first computer.

16. The computer system of claim 14, wherein the first encryption technique and the second encryption technique comprise a same core encryption technique.

17. The computer system of claim 16, wherein the first encryption technique and the second encryption technique employ at least one different input.

* * * * *